United States Patent
Xia et al.

(10) Patent No.: US 9,003,006 B2
(45) Date of Patent: Apr. 7, 2015

(54) INTERCLOUD APPLICATION VIRTUALIZATION

(75) Inventors: Chun Xia, Palo Alto, CA (US); Bin Li, Mountain View, CA (US); Bo Yu, Jilin (CN)

(73) Assignee: MASH5 Technologies, Inc., Santa Clara, CA (US)

( * ) Notice: Subject to any disclaimer, the term of this patent is extended or adjusted under 35 U.S.C. 154(b) by 155 days.

(21) Appl. No.: 13/419,749

(22) Filed: Mar. 14, 2012

(65) Prior Publication Data

US 2012/0239825 A1   Sep. 20, 2012

Related U.S. Application Data

(60) Provisional application No. 61/452,165, filed on Mar. 14, 2011.

(51) Int. Cl.
| | |
|---|---|
| *G06F 15/173* | (2006.01) |
| *G06F 9/445* | (2006.01) |
| *G06F 9/455* | (2006.01) |
| *G06F 9/50* | (2006.01) |

(52) U.S. Cl.
CPC ........ *G06F 9/44505* (2013.01); *G06F 9/45558* (2013.01); *G06F 9/5072* (2013.01); *G06F 8/63* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 2010/0175049 A1* | 7/2010 | Ramsey et al. | 717/115 |
| 2011/0145413 A1* | 6/2011 | Dawson et al. | 709/226 |
| 2011/0231899 A1* | 9/2011 | Pulier et al. | 726/1 |
| 2011/0265164 A1* | 10/2011 | Lucovsky et al. | 726/7 |
| 2011/0271270 A1* | 11/2011 | Bowen | 717/171 |
| 2012/0047239 A1* | 2/2012 | Donahue et al. | 709/220 |

OTHER PUBLICATIONS iPaaS: Integration for the Cloud Era, MuleSoft, Feb. 14, 2011, 4 pages.
Apache ServiceMix Introduction webpage (http://docs.huihoo.com/apache/servicemix/home.html), latest release date Jun. 23, 2009, 3 pages.
Matter, Greg, "The Intercloud" Greg Papadopoulos's Weblog, Feb. 20, 2009, 4 pages.
Rochwerger, B. et al., "The Reservoir Model and Architecture for Open Federated Cloud Computing," IBM J. Res. & Dev., vol. 53, No. 4, Paper 4, 2009, 11 pages.

(Continued)

*Primary Examiner* — Nicholas Taylor
*Assistant Examiner* — Clayton R Williams
(74) *Attorney, Agent, or Firm* — Finnegan, Henderson, Farabow, Garrett & Dunner LLP

(57) ABSTRACT

A method and a system for providing an application to be executed on a plurality of computer systems. The method includes: providing an interface for each computer system, wherein the interface includes at least one application container; and migrating a script of the application into each of the plurality of computer systems through the corresponding interface, wherein for each interface, the script is executable in the at least one application container of the interface.

14 Claims, 5 Drawing Sheets

(56) References Cited

OTHER PUBLICATIONS

Buyya, R. et al., "InterCloud: Utility-Oriented Federation of Cloud Computing Environments for Scaling of Application Services," C.-H. Hsu et al., (Eds.): ICA3PP 2010, Part I, LNCS 6081, pp. 13-31, 2010, 19 pages.

Bernstein, D. et al., "Intercloud Directory and Exchange Protocol Detail Using XMPP and RDF," CBSA: Cloud-based Services and Applications Workshop of: IEEE Services 2010, Jul. 5-10, 2010, Miami, Florida, 9 pages.

* cited by examiner

INTERCLOUD APPLICATION VIRTUALIZATION

The present application claims the benefits of priority to U.S. Provisional Patent Application No. 61/452,165, filed on Mar. 14, 2011, which is fully incorporated herein in its entirety.

TECHNICAL FIELD

The present invention relates to systems and methods for cloud computing, more particularly, to systems and methods for application level intercloud collaboration allowing application virtualization across multiple clouds.

BACKGROUND

Traditionally, application virtualization refers to the virtualization of system support. In other words, a virtual application means the application can be executed on a virtual machine (VM) of various operation systems (e.g., Windows, Linux, Solaris, etc.). It is desirable to develop a new application virtualization technique that allows an application to be executed in an inter-cloud environment (e.g., across multiple clouds).

SUMMARY

Some disclosed embodiments may include a method and a system for providing an application to be executed on a plurality of computer systems. The method includes: providing an interface for each computer system, wherein the interface includes at least one application container; and migrating a script of the application into each of the plurality of the computer systems through the corresponding interface, wherein for each interface, the script is executable in the at least one application container of the interface.

The preceding summary is not intended to restrict in any way the scope of the claimed invention. In addition, it is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments and exemplary aspects of the present invention and, together with the description, explain principles of the invention. In the drawings.

DESCRIPTION OF EXEMPLARY EMBODIMENTS

Reference will now be made in detail to exemplary embodiments of the invention, examples of which are represented in the accompanying drawings. When appropriate, the same reference numbers are used throughout the drawings to refer to the same or like parts.

Figure 1:
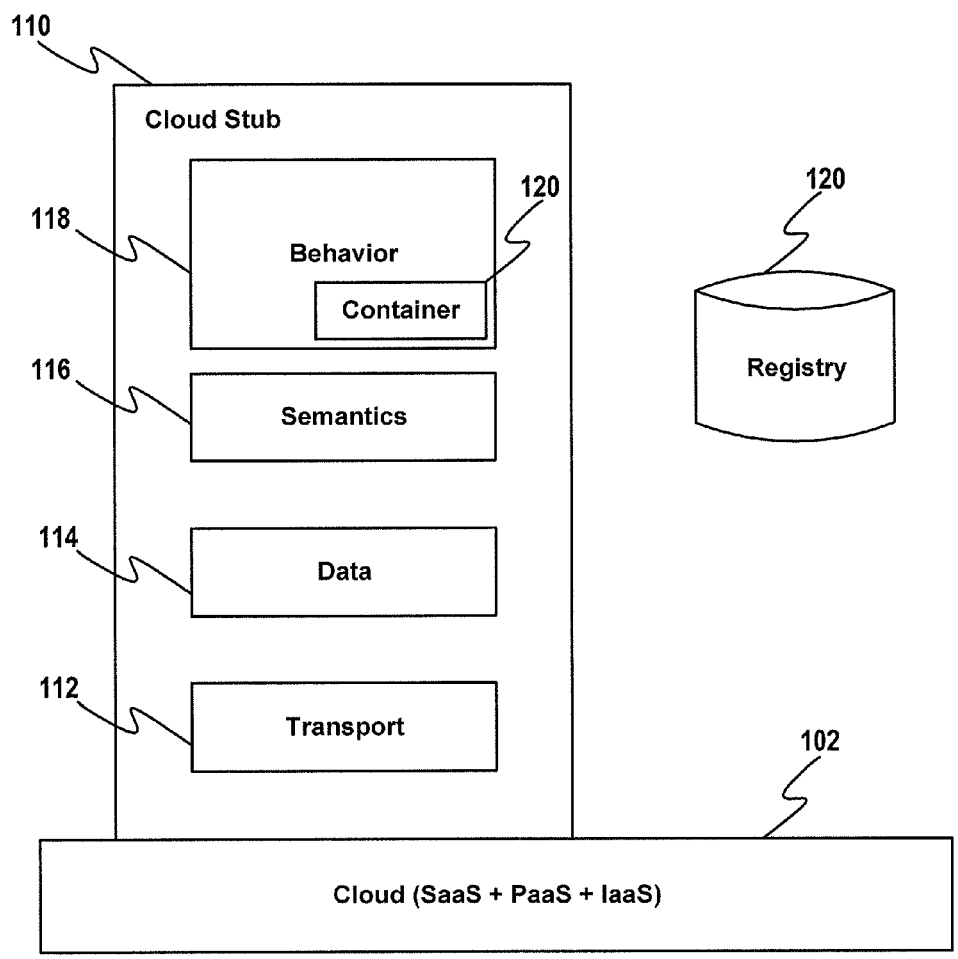
FIG. 1 is a diagrammatic representation of an exemplary cloud with a cloud stub, in accordance with some disclosed embodiments.

Embodiments of the invention may involve a cloud. The term "cloud" refers to a computer system configured to deliver computing as a service, whereby shared resources, software, and information are provided to computers and other devices as a utility over a network (e.g., the Internet). In a cloud computing environment, computation, software application, data access, data management and storage resources can be provided to cloud users without requiring the users to know the location and other details of the computing infrastructure. For example, FIG. 1 schematically illustrates a cloud 102.

A cloud may be implemented according to three fundamental models: Infrastructure as a service (IaaS), platform as a service (PaaS), and software as a service (SaaS). These three models can be implemented as three logical levels arranged vertically, in which IaaS is the lowest level and also the most basic level, whereas SaaS is the highest level. For example, cloud 102 in FIG. 1 includes all three models. It is noted that in some embodiments of the invention, fewer models may be utilized to implement a cloud.

In IaaS, cloud providers may offer computers (physical or virtual machines), raw (block) storage, firewalls, load balancers, networks, etc. These resources may be offered on demand from large pools installed in data centers. Local area networks including IP addresses may also be part of the resources. For the wide area connectivity, the Internet can be used or dedicated virtual private networks can be configured. Cloud users can install operating system images on the machines as well as their application software. In this model, the cloud user may be responsible for patching and maintaining the operating systems and application software. Cloud providers may bill IaaS services on a utility computing basis, that is, cost may reflect the amount of resources allocated and consumed.

In PaaS, cloud providers may deliver a computing platform and/or solution stack typically including operating system, programming language execution environment, database, web server, etc. Application developers can develop and run their software solutions on a cloud platform without the cost and complexity of buying and managing the underlying hardware and software layers. In some embodiments, the underlying computing and storage resources may scale automatically to match application demand such that a cloud user does not have to allocate resources manually.

In SaaS, cloud providers may install and operate application software in the cloud and cloud users can access the software from cloud clients. A cloud user usually does not manage the cloud infrastructure and platform on which the application is running. This eliminates the need to install and run the application on the cloud user's own computers, thereby simplifying maintenance and support. A cloud application may provide elasticity in a cloud environment. This can be achieved by cloning tasks onto multiple virtual machines at run-time to meet the changing work demand. Load balancers can distribute the work over the set of virtual machines. This process can be transparent to the cloud user who sees only a single access point. To accommodate a large number of cloud users, cloud applications can be multitenant, that is, one machine can serve more than one cloud user organization.

The term "intercloud" refers to techniques to interconnect a plurality of clouds. Such clouds may or may not be implemented according to a same set of models. For example, a cloud implemented according to PaaS may be interconnected with another cloud implemented according to SaaS. In another example, two clouds implemented according to different versions of SaaS may be interconnected. In some cases, it may be desirable to interconnect clouds implemented using different hardware/software architectures, communication protocols, confidential levels, etc. Therefore, it is challenging to achieve universal intercloud interconnection for resource sharing and collaboration.

Intercloud collaboration and/or resource sharing may be implemented through abstraction of layers involved in the information exchange among clouds. Each layer may be a logical collection of entities relating to resource sharing. For example, a layer may include one or more hardware devices, software instructions, communication standards, protocols, etc. In some embodiments, layers may be arranged in a vertical manner, in which higher level of layers may include more universal resource sharing schemes. The process of designing such layers can also be referred to as abstraction.

In some embodiments, a cloud to be interconnected with other clouds may be extended by a cloud stub. For example, FIG. 1 schematically illustrates a cloud stub 110. Cloud stub 110 may be built on top of PaaS at the application support level. Cloud stub 110 may contain four abstract layers: transport layer 112, data layer 114, semantics layer 116, and behavior layer 118.

Transport layer 112 may act as a communication path of inter-cloud data exchange based on certain standard. In some embodiments, transport layer 112 can establish the foundational inter-cloud communication infrastructure. Transport layer 112 can be implemented with reliable message queue solutions, e.g., Active MQ. Message brokers can be deployed into each participated cloud. Information transportation can be convenient and reliable throughout messaging publish/subscribe process. Transport layer 112 can also be implemented on top of XMPP (Extensible Messaging and Presence Protocol) protocol to meet real-time messaging requirements.

Data layer 114 may act as a payload of messages transmitted on transport layer 112. For virtualization, data can be normalized in order to establish a uniform data exchange interface. Data layer 114 may be implemented by leveraging ETL (Extract, Transform, Load) and ESB (Enterprise Services Bus) solutions, built on top of MQ technologies. Data layer 114 may include an enterprise application integration scenario for advanced data mapping, data routing, and/or intelligent data services. Mapping of master data can be promoted to an intercloud registry (to be discussed in greater detail later) for ontology level of look up. The ontology lookup may include data fields translation based on certain common field names.

Semantics layer 116 may contain corresponding semantic information of the data in lower layers. Semantics layer 116 may include interpretation of metadata, workflow, business rules, events data, etc., for intercloud interoperability. In some embodiments, semantic abstraction can be used in data virtualization scheme to insure business process across various private clouds. Semantics information may contain business rules, and support standard business process protocols such as BPEL (Business Process Execution Language). Semantic information may be organized in accordance with ontology. In some embodiments, ontology may have hierarchical structure, and registry lookup searches can support keyword expansion and result aggregation. In some embodiments, ontology manipulation can provide certain level of mapping intelligence with the help of intelligent agents.

Behavior layer 118 may contain behavior information which is formed by abstracted actions. Such behavior information may further establish concrete applications. In some embodiments, behavior information may be driven by semantics information. Virtualization at behavior layer 118 can enable application migration and deployment across multiple clouds, while maintaining substantially the same application behavior. Application virtualization at behavior layer 118 may be implemented using one or more uniform application containers (e.g., container 120) supplied by the underneath PaaS across multiple clouds. The application containers may contain a uniform run time environment and/or uniform supporting library. The supporting library may include a collection of standard modules. In some embodiments, application containers may favor script language such as Javascript and/or a rule language such as Java based Drool. In this case, application migration can be easier to support because only the source code in plain text needs to be migrated across clouds. In some embodiments, fine-grained virtualized application scripts or rules may not necessarily be symmetric. In other words, actual application codes running on each cloud may not be exactly the same. In this scenario, the collection of application codes on all interconnected clouds can be treated as a single virtualized application, while each piece of the application running on each cloud can constitute an application service and can be delivered as a web service. In some embodiments, a virtualized application may include an aggregation of such application services.

In some embodiments, a global resource registry 120 may be needed to maintain cloud node information in an intercloud environment. Cloud node information may be used to manage and/or facilitate accessing of resources/services provided by clouds. Registry 120 may include a directory service that contains capability data of each layer of a specific cloud. Virtualization may rely on a look up operation on the directory. Registry 120 can be implemented as a physically centralized service, a logical centralized but physically distributed service where underlying computers are located across the involved clouds, or a hierarchical structure similar to DNS (Domain Name System).

In some embodiments, registry 120 may include functionalities beyond merely a naming service. For example, registry 120 may keep resource description and/or profile for each of the behavior, semantics, and data abstract layers. Registry 120 may then be looked up for resource discovery. In some embodiments, an intelligent agent can apply certain matching policies to identify appropriate resources in specific cloud(s) using registry 120.

In some embodiments, registry 120 may be implemented as a central service, residing in a selected cloud. In some embodiments, registry 120 may have hot standby in another cloud in a different geo-location to avoid geographical failure. Although relatively simple to implement, the centralized scheme may lack enough scalability, and may risk a single point of failure. When scalability and/or reliability requirements are high, registry 120 can be alternatively implemented in a distributed manner. For example, registry 120 can be implemented similar to DHT (Distributed Hash Table) in accordance with a peer-to-peer content sharing protocol such as BitTorrent.

Figure 2:
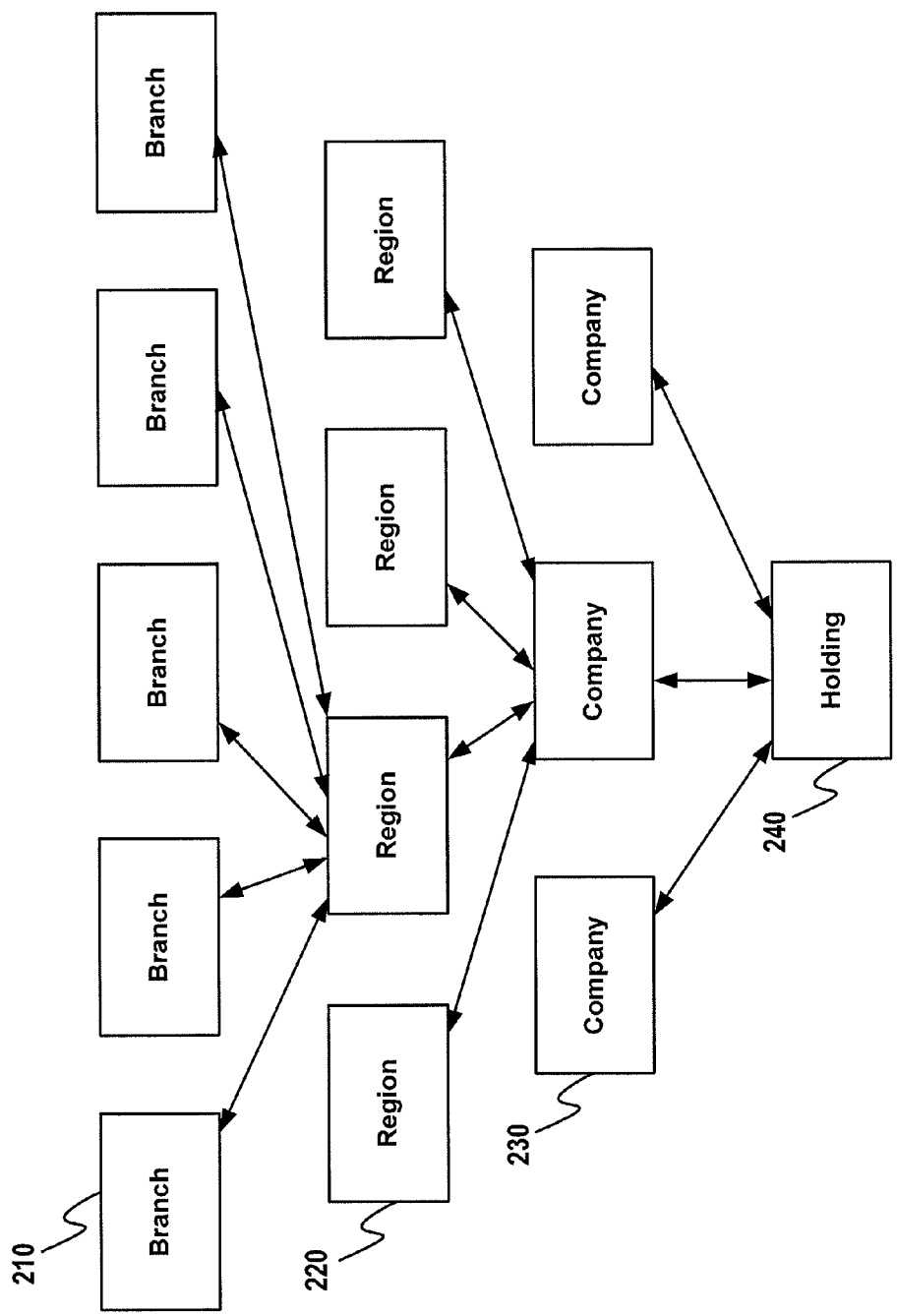
FIG. 2 is a diagrammatic representation of a multi-cloud environment before application virtualization, in accordance with some disclosed embodiments.

FIG. 2 is a diagrammatic representation of a multi-cloud environment before application virtualization, in accordance with some disclosed embodiments. In FIG. 2, a holding entity 240 is a large business entity that owns multiple companies 230. In some embodiments, holding entity 240 may also be a loosely organized business alliance or partnership, such as a supply chain, an industry consortium, etc. Each company 230 has multiple regional offices 220, and each regional office 220 has multiple branch offices 210. Similar organization structure can be commonly found at large enterprises such GE and Bank of America, where branch offices, regional offices, company headquarters, and the holding entity are in different physical locations and may require private clouds to maximize security and operational efficiency. In some embodiments, a company 230 may wish to oversee all of its regional offices 220, and may have to interconnect with multiple private clouds (e.g., associated with multiple regional offices 220).

Figure 3:
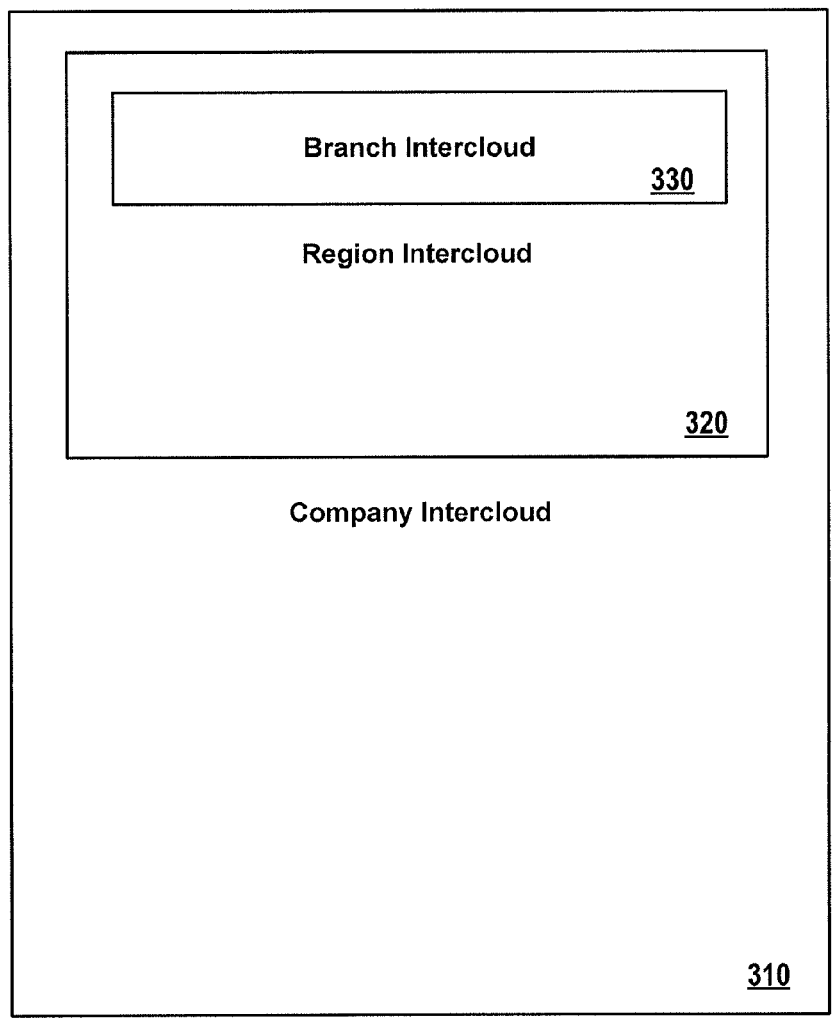
FIG. 3 is a diagrammatic representation of a multi-cloud environment after application virtualization, in accordance with some disclosed embodiments.

Application virtualization may be implemented to enable information exchange and/or resource sharing. FIG. 3 is a diagrammatic representation of an application virtualization example, in accordance with another embodiment. Referring to FIG. 3, all private clouds of branch offices 210 belonging to a regional office 220 can be virtualized into a branch intercloud 330. Similarly, all private clouds of regional offices 220 belonging to one company 230 may form a region intercloud 320, and all private clouds of companies belonging to the holding entity 240 may form a company intercloud 310. As a result, holding entity 240 can benefit from company intercloud 310 by viewing all companies' private clouds as a single virtual intercloud. An accounting application of holding entity 240, for example, can be virtualized to be executed across all companies.

Figure 4:
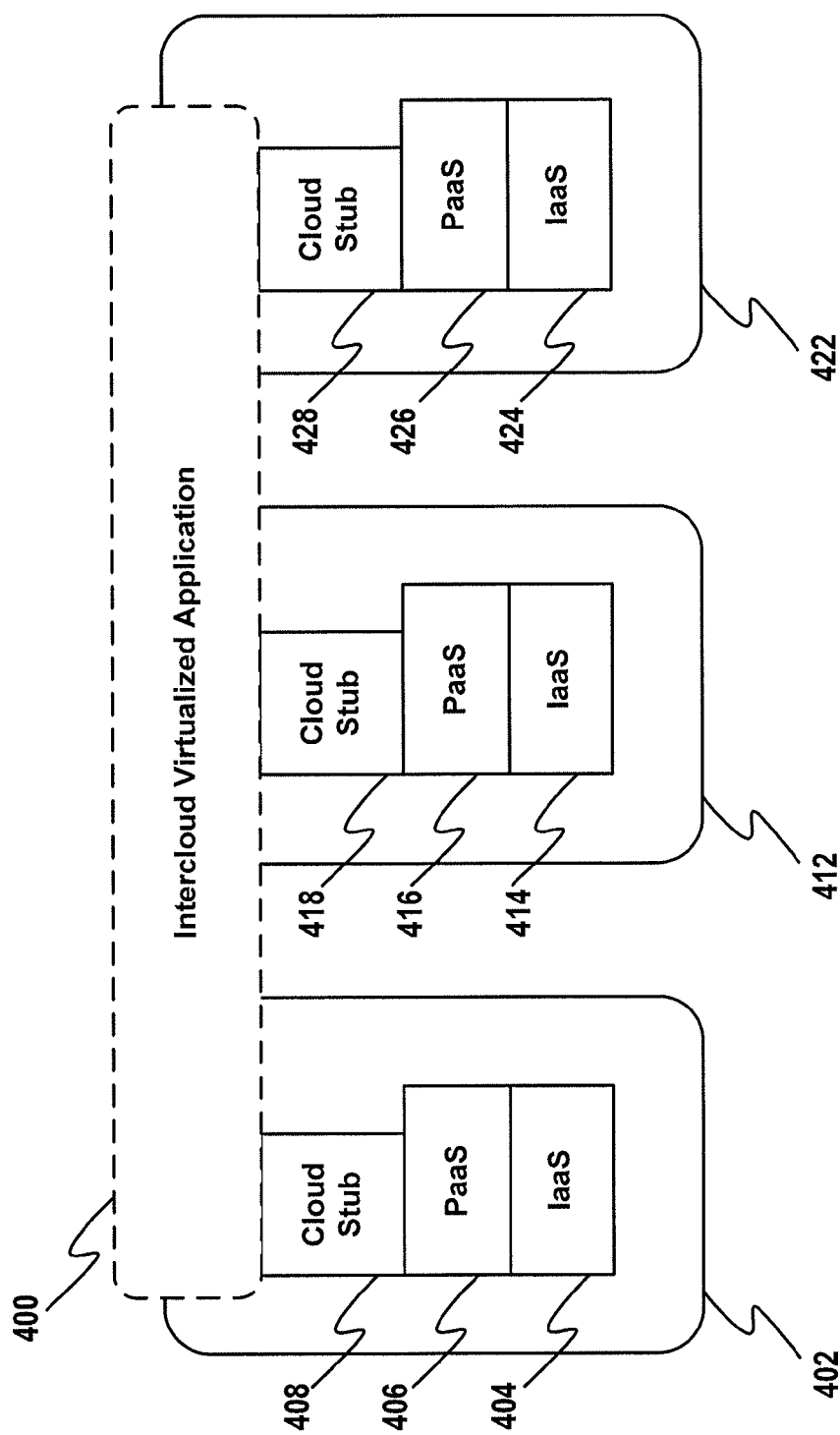
FIG. 4 is a diagrammatic representation of an application virtualization example, in accordance with another embodiment.

Application virtualization can be implemented with one or more cloud stubs (e.g., 110) attached to each cloud. FIG. 4 shows three clouds 402, 412, and 422, each can be a private cloud or a virtual private cloud (VPC, e.g., private cloud services virtually sliced from a public cloud). In each cloud, an IaaS (404, 414, and 424) provides virtualized hardware resources and operating systems to form a plurality of VMs (virtual machines). Hardware server nodes may contain CPUs, memories, and network interfaces. IaaS (404, 414, and 424) also provides storage resources, such as storage solutions similar to Amazon S3 or Google GFS, and networking resources to supply bandwidth and interconnectivity within the IaaS. PaaS (406, 416, and 426) resides in the application support level to supply web servers, application servers, databases, integration middleware, etc. Cloud stub (408, 418, and 428) provides an extension to PaaS. With the support of cloud stubs (e.g., 408, 418, and 428), an intercloud virtualized application 400 can be created, deployed, and executed across multiple clouds (e.g., 402, 412, and 422). In some embodiments, a portion/piece of virtualized application 400 may be physically resided in each cloud. In some embodiments, such pieces of virtualized application 400 can be migrated from one cloud to another cloud on demand.

In some embodiments, resources supplied by IaaS (404, 414, and 424) may include computing, storage, and networking. It is noted that during application virtualization, these three types of resources may not necessarily be virtualized separately. Instead, virtualized application can be implemented as a web service. As long as the web service can be virtualized, intercloud application virtualization can be achieved across multiple clouds. In other words, if an application web service does not attach to a specific physical cloud, but instead a logical collection of clouds, that application can be virtualized. For example, the virtualization can be achieved by establishing a logical single image of multiple web service pieces recited in multiple participated clouds (e.g., service mapping). In some embodiments, such logical single image can be established through URL mapping similar to a virtual host scheme. The URL mapping can also function as a load balancer, and may also provide fail-over and/or a proxy (or reverse proxy) service for enhanced security. In some embodiment, the proxy service may utilize SSL and/or X.509. Alternatively or additionally, the proxy service may also check permissions and content for inbound and outbound data message, and follow security compliance.

In some embodiments, even with virtualization, sensitive raw data can still reside within their original private cloud. In this case, instead of exposing the sensitive raw data to an external requester, the external requester can have an external application migrated into a private cloud. The external application may contain a set of business rules and/or scripts, and can be executed in the private cloud. Instead of returning sensitive raw data to the external requester, the external application can operate in the private cloud in accordance with a certain algorithm, agreement, rule, script, etc., to compute a result based on the sensitive raw data without revealing these sensitive raw data to the external requester. After the result is obtained, the result can be return to the outside requester. As a result, application migration resulting from application virtualization may protect sensitive raw data and at the same time utilize such data outside their original private cloud.

In some embodiments, encryption can be applied to data layer 114 at cloud stub 110, providing application level security enhancement. Encrypted content may include business data and/or business rules. In some embodiments, business rules can be written in a script language and exposed as plain text, while are considered as application codes. As a result, encryption on business rules makes virtualized application highly secured.

In some embodiments, PaaS (e.g., 406, 416, and 426) may supply application containers such that a virtualized application can be executed with the same behavior at remote clouds upon migration and/or expansion. An application container can accept remotely transferred application codes in scripts and/or rules. For example, in case of accepting rules, a rule engine and a workflow engine within the PaaS can manifest the semantic layer (e.g., 116) of rule data. In some embodiments, rules can be triggered by events from remote clouds. In some embodiments, PaaS may be responsible for user management, user authentication and authorization across clouds. Accordingly, access control may be implemented within PaaS.

Registry 120 may facilitate all containers to maintain a global namespace across all involved clouds. The global namespace can be used for uniquely identifying data, events, and/or rules in a distributed cloud environment. In some embodiments, user mapping among multiple clouds may be assisted by registry 120 for assigning each user a unique global identity.

Figure 5:
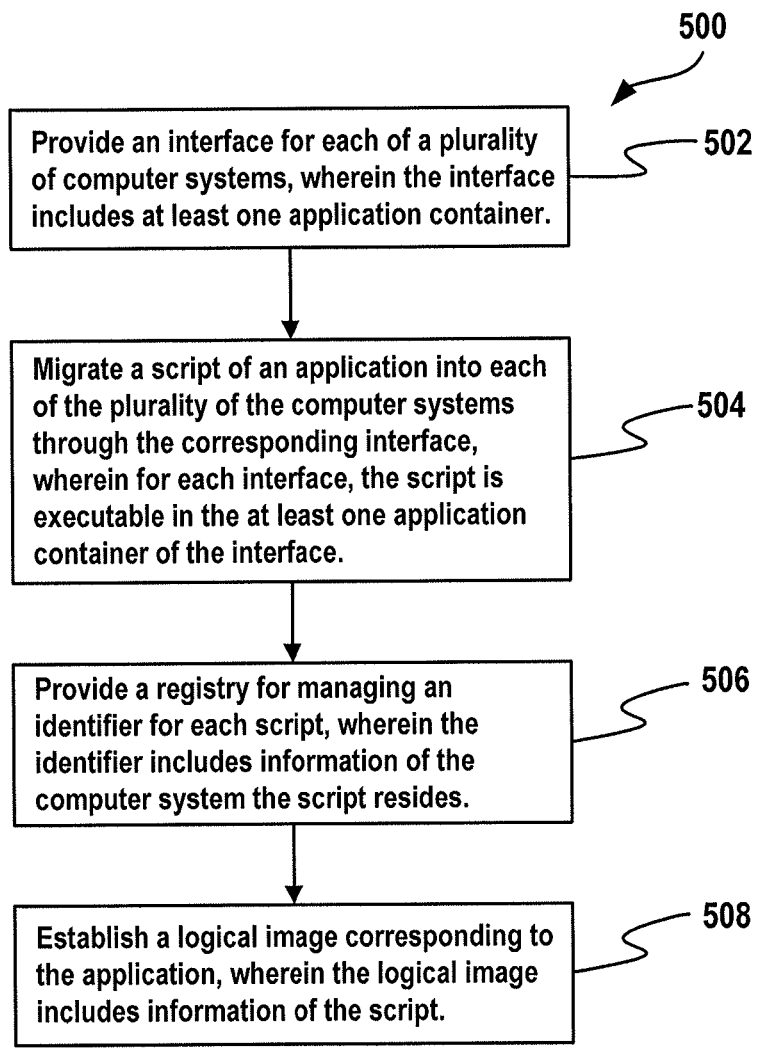
FIG. 5 provides an exemplary flow chart of a method for implementing application virtualization, in accordance with some disclosed embodiments.

FIG. 5 provides an exemplary flow chart of a method for implementing application virtualization, in accordance with some disclosed embodiments. In FIG. 5, an example method 500 includes a series of steps that can be performed by a computer to implement application virtualization in an intercloud environment. In some embodiments, one or more steps may be omitted or optional. In some embodiments, one or more steps may be performed in a different order as that shown in FIG. 5.

In step 502, an interface (e.g., cloud stub 110 in FIG. 1, cloud stubs 408, 418, and 428 in FIG. 4) may be provided for each of a plurality of computer systems (e.g., clouds 402, 412, and 422 in FIG. 4). The interface may include at least one application container (e.g., container 120).

In step 504, a script (e.g., a piece or a portion of the application, an instruction code, a program language script, a business script/rule, etc.) of an application may be migrated into each of the plurality of the computer systems through the corresponding interface (e.g., cloud stubs 408, 418, and 428). For each interface, the script is executable in the at least one application container (e.g., container 120) of the interface. For example, the application container can be a Java runtime container and the script can be a Java script.

In step 506, a registry (e.g., registry 120) may be provided for managing an identifier (e.g., cloud node information) for each script, wherein the identifier includes information of the computer system the script resides. For example, registry 120 may contain records of each involved cloud on which a virtualized application executes.

In step 508, a logical image corresponding to the application may be established (e.g., virtualizing the application), wherein the logical image includes information of the script (e.g., mapping information).

Intercloud collaboration and/or resource sharing can be implemented on a distributed operating system including a plurality of computers. The computers may include data center, workstation, portable computing device, mobile communication device, etc. Application virtualization implemented on an intercloud environment may provide global interoperable intercloud application services that are particularly critical to mobile applications.

In the foregoing Description of Exemplary Embodiments, various features are grouped together in a single embodiment for purposes of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Description of the Exemplary Embodiments, with each claim standing on its own as a separate embodiment of the invention.

Moreover, it will be apparent to those skilled in the art from consideration of the specification and practice of the present disclosure that various modifications and variations can be made to the disclosed systems and methods without departing from the scope of the invention, as claimed. Thus, it is intended that the specification and examples be considered as exemplary only, with a true scope of the present disclosure being indicated by the following claims and their equivalents.

What is claimed is:

1. A method, implemented by at least one computer, for executing an intercloud application on a plurality of computer systems, comprising:
   establishing an application interface on each of the plurality of computer systems, wherein the application interface includes:
      a transport layer having a message broker for transporting information through a publish/subscribe messaging process for intercloud data transmission;
      a data layer having a data exchange interface for processing data, the processing including mapping the information transported in the transport layer;
      a semantics layer having a rule set for interpreting semantic meaning of the processed data in the data layer for intercloud interoperability; and
      a behavior layer having an application container, the application container including a rule engine for manifesting rules according to the rule set in the semantics layer for intercloud migration and expansion;
   sending, by the at least one computer, a program of the intercloud application into at least one of the plurality of computer systems through the application interface of the at least one of the plurality of computer systems, wherein the program includes rule data for triggering the rule engine to determine an execution behavior of the program based on the rule set in the semantic layer, wherein the program, when executed by the at least one of the plurality of computer systems according to the determined execution behavior, computes a result based on raw data stored in the at least one of the plurality of computer systems; and
   receiving, by the at least one computer, the result from the at least one of the plurality of computer systems.

2. The method of claim 1, wherein the plurality of the computer systems include at least one of:
   an Infrastructure as a service (IaaS),
   a platform as a service (PaaS), or
   a software as a service (SaaS).

3. The method of claim 1, further comprising:
   providing a registry for managing profiles of resources in the behavior layer, semantics layer, and data layer of each of the plurality of computer systems, wherein the registry includes an identifier of the program, the identifier including information of the computer system to which the program is sent.

4. The method of claim 1, further comprising:
   establishing, by the at least one computer, a logical image corresponding to the intercloud application, wherein the logical image includes information of the program.

5. The method of claim 1, wherein the program is in the form of a script of source codes.

6. A system for application virtualization, comprising:
   a hardware processor device operatively coupled to a memory for executing an intercloud application on a plurality of computer systems, wherein each of the plurality of computer systems includes an application interface, the application interface including:
      a transport layer having a message broker for transporting information through a publish/subscribe messaging process for intercloud data transmission;
      a data layer having a data exchange interface for processing data, the processing including mapping the information transported in the transport layer;
      a semantics layer having a rule set for interpreting semantic meaning of the processed data in the data layer for intercloud interoperability; and
      a behavior layer having an application container, the application container including a rule engine for manifesting rules according to the rule set in the semantics layer for intercloud migration and expansion;
   wherein the hardware processor device is configured to send a program of the intercloud application into at least one of the plurality of computer systems through the application interface of the at least one of the plurality of computer systems, wherein the program includes rule data for triggering the rule engine to determine an execution behavior of the program based on the rule set in the semantic layer, wherein the program, when executed by the at least one of the plurality of computer systems according to the determined execution behavior, computes a result based on raw data stored in the at least one of the plurality of computer systems; and
   wherein the hardware processor device is configured to receive the result from the at least one of the plurality of computer systems.

7. The system of claim 6, wherein the plurality of the computer systems include at least one of:

an Infrastructure as a service (IaaS),
a platform as a service (PaaS), or
a software as a service (SaaS).

8. The system of claim 6, further comprising:
a registry configured to manage profiles of resources in the behavior layer, semantics layer, and data layer of each of the plurality of computer systems, wherein the registry includes an identifier of the program, the identifier including information of the computer system to which the program is sent.

9. The system of claim 6, further comprising:
a logical image corresponding to the intercloud application, wherein the logical image includes information of the program.

10. The system of claim 6, wherein the program is in the form of a script of source codes.

11. The system of claim 6, wherein the system is further configured to establish the application interface for each of the plurality of computer systems.

12. A method, implemented by at least one computer, for collecting information from a plurality of computer clouds, each computer cloud including one or more computer systems, the method comprising:
establishing a cloud stub on each of the plurality of computer clouds, wherein the cloud stub includes:
a transport layer having a message broker for transporting information through a publish/subscribe messaging process for intercloud data transmission;
a data layer having a data exchange interface for processing data, the processing including mapping the information transported in the transport layer;
a semantics layer having a rule set for interpreting semantic meaning of the processed data in the data layer for intercloud interoperability; and
a behavior layer having an application container, the application container including a rule engine for manifesting rules according to the rule set in the semantics layer for intercloud migration and expansion;
sending, by the at least one computer, a source-code script into at least one of the plurality of computer clouds through the cloud stub of the at least one of the plurality of computer clouds, wherein the source-code script includes one or more rules for triggering the rule engine to determine an execution behavior of the source-code script based on the rule set in the semantic layer, wherein the source-code script, when executed by the at least one of the plurality of computer clouds according to the determined execution behavior, computes a result based on raw data stored in the at least one of the plurality of computer clouds; and
receiving, by the at least one computer, the result from the at least one of the plurality of computer clouds.

13. The method of claim 12, wherein the source-code script is in the form of plain text.

14. The method of claim 12, further comprising:
providing a registry for managing profiles of resources in the behavior layer, semantics layer, and data layer of each of the plurality of computer clouds, wherein the registry includes an identifier of the source-code script, the identifier including information of the computer cloud to which the source-code script is sent.

* * * * *